(12) United States Patent
Kobylinski

(10) Patent No.: US 7,774,695 B2
(45) Date of Patent: Aug. 10, 2010

(54) PRESENTING DATA TO A USER IN A THREE-DIMENSIONAL TABLE

(75) Inventor: Krzysztof R. Kobylinski, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 11/382,831

(22) Filed: May 11, 2006

(65) Prior Publication Data

US 2007/0266308 A1 Nov. 15, 2007

(51) Int. Cl.
*G06F 17/00* (2006.01)
(52) U.S. Cl. ............... 715/227; 715/212; 715/214; 715/848; 715/850
(58) Field of Classification Search .......... 715/227, 715/212, 214, 848, 850
See application file for complete search history.

(56) References Cited

U.S. PATENT DOCUMENTS

| | | | |
|---|---|---|---|
| 5,319,777 A | 6/1994 | Perez | |
| 5,359,724 A * | 10/1994 | Earle | 707/205 |
| 5,557,712 A | 9/1996 | Guay | |
| 5,572,644 A * | 11/1996 | Liaw et al. | 715/209 |
| 5,604,854 A * | 2/1997 | Glassey | 715/209 |
| 5,724,492 A * | 3/1998 | Matthews et al. | 345/419 |
| 5,880,733 A * | 3/1999 | Horvitz et al. | 715/850 |
| 6,023,275 A | 2/2000 | Horvitz et al. | |
| 6,104,325 A | 8/2000 | Liaw et al. | |
| 6,184,889 B1 | 2/2001 | D'Amora | |
| 6,229,542 B1 * | 5/2001 | Miller | 715/782 |
| 6,282,551 B1 | 8/2001 | Anderson et al. | |
| 6,369,839 B1 * | 4/2002 | Peterson | 715/835 |
| 6,597,358 B2 * | 7/2003 | Miller | 345/427 |
| 6,629,097 B1 | 9/2003 | Keith | |
| 6,707,454 B1 * | 3/2004 | Barg et al. | 345/440 |
| 6,718,386 B1 * | 4/2004 | Hanfland | 709/225 |
| 6,859,907 B1 * | 2/2005 | McGarry | 715/201 |
| 6,973,642 B2 | 12/2005 | Minemoto | |
| 7,240,291 B2 * | 7/2007 | Card et al. | 715/776 |
| 7,624,339 B1 * | 11/2009 | Engel et al. | 715/214 |
| 2001/0016855 A1 * | 8/2001 | Hiroshige | 707/503 |
| 2002/0091728 A1 | 7/2002 | Kjaer et al. | |
| 2002/0184260 A1 * | 12/2002 | Martin et al. | 707/503 |
| 2003/0188259 A1 | 10/2003 | Aureglia et al. | |
| 2004/0088239 A1 | 5/2004 | Eder | |
| 2004/0113915 A1 * | 6/2004 | Ohtsuki et al. | 345/582 |

OTHER PUBLICATIONS

Steve Johnson, Show Me Microsoft(R) Office Excel 2003, Sep. 24, 2003, Que, "Getting Started with Excel".*

\* cited by examiner

*Primary Examiner*—Stephen S Hong
*Assistant Examiner*—I-Chan Yang
(74) *Attorney, Agent, or Firm*—Marcia L. Doubet

(57) ABSTRACT

An improved solution for presenting data to a user is provided. In particular, the data can include multiple instances of a dataset, which are displayed in a three-dimensional table. The three-dimensional table allows the user to perform various manipulations on it. For example, the user can rotate the table, scroll through the table, simultaneously view at least two instances of the dataset, and the like. Additionally, the three-dimensional table can enable the user to perform various operations on the data to further customize the presented data.

19 Claims, 11 Drawing Sheets

FIG. 6

| NAME | 2ND QUARTER | | |
|---|---|---|---|
| | SALES | COSTS | PROFIT |
| WIDGET A | $40,000 | $20,000 | $20,000 |
| WIDGET B | $35,000 | $18,000 | $17,000 |
| WIDGET C | $48,000 | $26,000 | $22,000 |
| WIDGET D | $47,000 | $26,000 | $21,000 |
| TOTAL | $170,000 | $90,000 | $80,000 |

| NAME | 4TH QUARTER | | |
|---|---|---|---|
| | SALES | COSTS | PROFIT |
| WIDGET A | $42,000 | $20,000 | $22,000 |
| WIDGET B | $38,000 | $18,000 | $20,000 |
| WIDGET C | $46,000 | $26,000 | $20,000 |
| WIDGET D | $52,000 | $26,000 | $26,000 |
| TOTAL | $178,000 | $90,000 | $88,000 |

FIG. 9

BUILD DATE 2

| COMPONENT | VERSION | STATUS |
|---|---|---|
| COMPONENT A | 5.1.0 | FAILURE |
| COMPONENT B | 5.0.9 | SUCCESS |
| COMPONENT C | 1.0.0 | FAILURE |
| COMPONENT D | 5.0.9 | SUCCESS |
| COMPONENT E | 5.0.9 | SUCCESS |

BUILD DATE 4

| COMPONENT | VERSION | STATUS |
|---|---|---|
| COMPONENT A | 5.1.1 | SUCCESS |
| COMPONENT B | 5.1.1 | SUCCESS |
| COMPONENT C | 1.0.1 | SUCCESS |
| COMPONENT D | 5.1.1 | SUCCESS |
| COMPONENT E | 5.1.1 | SUCCESS |

52

PRESENTING DATA TO A USER IN A THREE-DIMENSIONAL TABLE

BACKGROUND OF THE INVENTION

1. Technical Field

The invention relates generally to presenting data to a user, and more particularly, to a solution for generating a three-dimensional table for displaying data, which allows a user to perform various manipulations on the table to alter the displayed data.

2. Background Art

Data is often displayed in a two-dimensional table (e.g., spreadsheet). This display format is highly versatile and is effective at presenting numerous types of data to a user for review, comparison, modification, etc. However, for some data, such as data that acquires new values over several instances (e.g., time intervals, geographic areas, etc.), a third-dimension is desirable. For example, a two-dimensional table effectively displays numerous attributes (e.g., name, sales, costs, profits, etc.) for several items (e.g., products). However, the two-dimensional table does not effectively display how this information may have changed over numerous instances (e.g., fiscal quarters) of the data. To this extent, the two-dimensional table does not allow for a ready comparison of a varying number of instances, two or more particular instances, or the like.

As a result, it is often desirable to display data in three-dimensions. However, current solutions do not provide functionality that would enable a user to selectively manipulate the three-dimensional table thereby altering the displayed data in a desired manner. Consequently, the usefulness of displaying data in three-dimensions has been limited to date. In light of this, a need exists for an improved solution for presenting data to a user in a three-dimensional table that allows a user to perform various manipulations to the table.

SUMMARY OF THE INVENTION

The invention provides an improved solution for presenting data to a user in a three-dimensional table. In particular, the invention generates the three-dimensional table, which has a front face and at least one side face, to display the data. The front face can comprise a two-dimensional table that displays data for one of a plurality of instances of a dataset in the data. Subsequently, the three-dimensional table can be manipulated by rotating the table, displaying another dataset instance/two-dimensional table as a front face, displaying two or more dataset instances/two-dimensional tables simultaneously, etc. Additionally, a user can perform one or more operations on the data, such as sorting, filtering, adding calculations, and the like. As a result, the invention provides a comprehensive solution for displaying data in a three-dimensional format.

A first aspect of the invention provides a method of managing a three-dimensional table for presenting data, the method comprising: generating the three-dimensional table for the data, wherein the three-dimensional table comprises a plurality of two-dimensional tables that define a front face and at least one side face; receiving a manipulation request; and manipulating the three-dimensional table based on the manipulation request.

A second aspect of the invention provides a method of managing a three-dimensional table for presenting data, the method comprising: obtaining the data, wherein the data comprises a plurality of instances of a dataset; generating a front face of the three-dimensional table, wherein the front face comprises one of the plurality of instances; generating at least one side face of the three-dimensional table, wherein the at least one side face comprises each of the plurality of instances; receiving a manipulation request; and manipulating the three-dimensional table based on the manipulation request.

A third aspect of the invention provides a system for managing a three-dimensional table for presenting data, the system comprising: a display system for generating the three-dimensional table for the data, wherein the three-dimensional table comprises a plurality of two-dimensional tables that define a front face and at least one side face; and a manipulation system for receiving a manipulation request and manipulating the three-dimensional table based on the manipulation request.

A fourth aspect of the invention provides a program product stored on a computer-readable medium, which when executed, manages a three-dimensional table for presenting data, the program product comprising: program code for generating the three-dimensional table for the data, wherein the three-dimensional table comprises a plurality of two-dimensional tables that define a front face and at least one side face; program code for receiving a manipulation request; and program code for manipulating the three-dimensional table based on the manipulation request.

A fifth aspect of the invention provides an interface for presenting data to a user, the interface comprising: means for generating a three-dimensional table for the data, wherein the three-dimensional table comprises a plurality of two-dimensional tables that define a front face and at least one side face; means for displaying the three-dimensional table to the user; means for receiving a manipulation request from the user; and means for manipulating the three-dimensional table based on the manipulation request.

A sixth aspect of the invention provides a method of deploying an application for managing a three-dimensional table for presenting data, the method comprising: providing a computer infrastructure being operable to: obtain the data, wherein the data comprises a plurality of instances of a dataset; generate a front face of the three-dimensional table, wherein the front face includes data for one of the plurality of instances; generate at least one side face of the three-dimensional table that comprises each of the plurality of instances; receive a manipulation request; and manipulate the three-dimensional table based on the manipulation request.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 6 shows the illustrative three-dimensional table of FIG. 2 simultaneously displaying two tables;

FIGS. 8-10 show an illustrative three-dimensional table for displaying a plurality of instances of a build dataset according to an embodiment of the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides an improved solution for presenting data to a user in a three-dimensional table. In particular, the invention generates the three-dimensional table, which has a front face and at least one side face, to display the data. The front face can comprise a two-dimensional table that displays data for one of a plurality of instances of a dataset in the data. Subsequently, the three-dimensional table can be manipulated by rotating the table, displaying another dataset instance/two-dimensional table as a front face, displaying two or more dataset instances/two-dimensional tables simultaneously, etc. Additionally, a user can perform one or more operations on the data, such as sorting, filtering, adding calculations, and the like. As a result, the invention provides a comprehensive solution for displaying data in a three-dimensional format.

Figure 1:
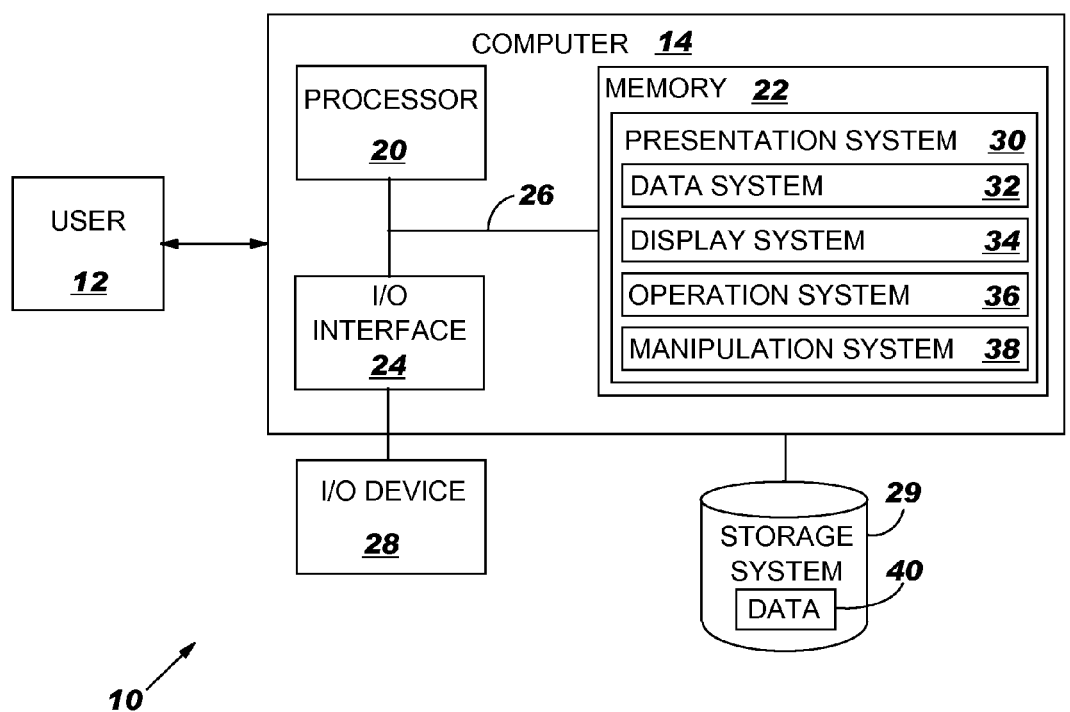
FIG. 1 shows an illustrative system for presenting data to a user according to one embodiment of the invention.

Turning to the drawings, FIG. 1 shows an illustrative system 10 for presenting data 40 to a user 12. In particular, a presentation system 30 manages a three-dimensional table for presenting data 40 to user 12. In response to one or more manipulation requests and/or operation requests, presentation system 30 can manipulate the three-dimensional table to change the portion of data 40 that is displayed, the amount of data 40 that is displayed, and/or the manner in which data 40 is displayed.

Presentation system 30 is shown implemented on computer 14 as computer program code. To this extent, computer 14 is shown including a processor 20, a memory 22, an input/output (I/O) interface 24, and a bus 26. Further, computer 14 is shown in communication with an external I/O device/resource 28 and a storage system 29. In general, processor 20 executes computer program code, such as presentation system 30, that is stored in memory 22 and/or storage system 29. While executing computer program code (e.g., presentation system 30), processor 20 can read and/or write data, such as data 40, to/from memory 22, storage system 29, and/or I/O interface 24. Bus 26 provides a communication link between each of the components in computer 14. I/O device 28 can comprise any device that enables user 12 to interact with computer 14 (e.g., keyboard, pointing device, display, etc.).

Alternatively, user 12 can interact with another computing device (not shown) in communication with computer 14. In this case, I/O device 28 can comprise any device that enables computer 14 to communicate with one or more other computing devices (e.g., network adapter, I/O port, modem, etc.) over a network. The network can comprise any combination of various types of communications links. For example, the network can comprise addressable connections that may utilize any combination of wireline and/or wireless transmission methods. In this instance, the computing devices (e.g., computer 14) may utilize conventional network connectivity, such as Token Ring, Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer 14 is only representative of various possible combinations of hardware. For example, processor 20 may comprise a single processing unit, or be distributed across one or more processing units in one or more locations, e.g., on a client and server. Similarly, memory 22 and/or storage system 29 can comprise any combination of various types of data storage and/or transmission media that reside at one or more physical locations. Further, I/O interface 24 can comprise any system for exchanging information with one or more I/O devices 28. Still further, it is understood that one or more additional components (e.g., system software, math co-processor, etc.) not shown in FIG. 1 can be included in computer 14. To this extent, computer 14 can comprise any type of computing device such as a network server, a desktop computer, a laptop, a handheld device, a mobile phone, a pager, a personal data assistant, etc. However, if computer 14 comprises a handheld device or the like, it is understood that one or more I/O devices 28 (e.g., a display) and/or storage system 29 could be contained within computer 14, not externally as shown.

As discussed further below, presentation system 30 manages a three-dimensional table for presenting data 40 to user 12. To this extent, presentation system 30 is shown including a data system 32 for managing data 40, a display system 34 for generating the three-dimensional table for data 40, an operation system 36 for performing one or more operations on data 40, and a manipulation system 38 for manipulating the three-dimensional table. Operation of each of these systems is discussed further below. However, it is understood that some of the various systems shown in FIG. 1 can be implemented independently, combined, and/or stored in memory for one or more separate computers 14 that communicate over a network. Further, it is understood that some of the systems and/or functionality may not be implemented, or additional systems and/or functionality may be included as part of system 10.

As mentioned above, data system 32 manages data 40. Data 40 can comprise any type/format of data. In one embodiment, data 40 comprises a plurality of instances of a dataset. Each dataset can include one or more items with corresponding values for one or more attributes of each item. To this extent, data 40 can be stored in storage system 29 using any conventional manner such as one or more tables in a database, one or more files, etc. When user 12 requests to view all or a portion of data 40, data system 32 can retrieve the requested data 40 from storage system 29, and store it in memory 22 in a three-dimensional array or the like.

Figure 2:
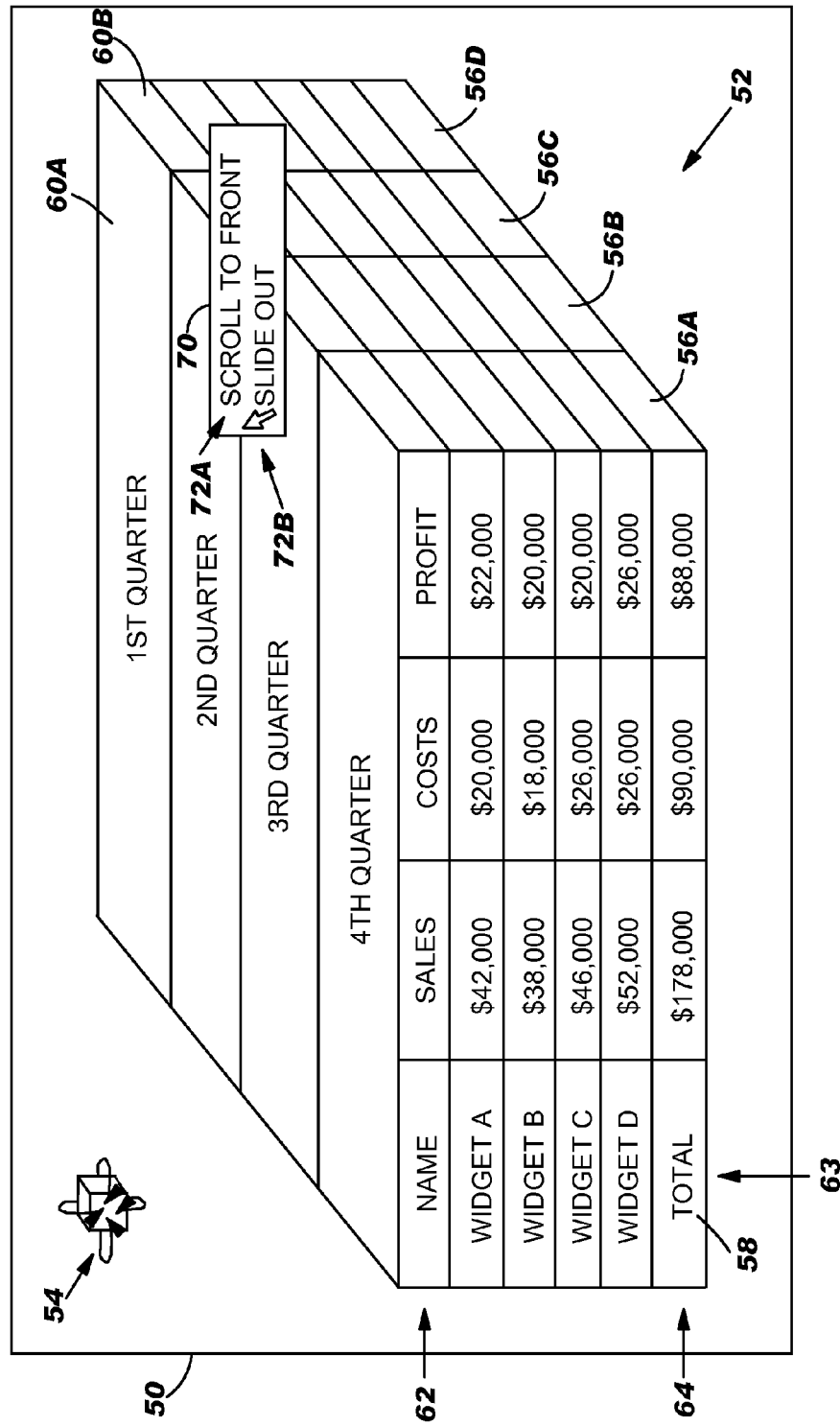
FIG. 2 shows an illustrative interface for presenting data to a user according to another embodiment of the invention.

In any event, data system 32 can provide data 40 to display system 34 for presentation to user 12. Display system 34 can generate a three-dimensional table and/or an interface that includes the three-dimensional table for presenting data 40 to user 12. Subsequently, display system 34 can display the three-dimensional table/interface or provide the three-dimensional table/interface to another system (not shown) for rendering. For example, FIG. 2 shows an illustrative interface 50 for presenting data 40 (FIG. 1) to user 12 (FIG. 1). To this extent, interface 50 is shown including a three-dimensional table 52. As shown, three-dimensional table 52 can display data 40 that comprises a plurality of quarterly sales summaries for various widgets (e.g., WIDGETS A-D). However, it is understood that this is only illustrative of countless applications and combinations of data that can be displayed using the current invention.

Regardless, three-dimensional table 52 can comprise a plurality of two-dimensional tables 56A-D that define a front face 58 and at least one side face 60A-B. In this case, one of the plurality of two-dimensional tables (e.g., two-dimensional table 56A) is displayed as front face 58, and each side face 60A-B comprises a row for each of the two-dimensional tables 56A-D. When data 40 (FIG. 1) comprises a plurality of instances of a dataset, each two-dimensional table 56A-D can correspond to one instance of the dataset, and each side face 60A-B can comprise a row that corresponds to each instance of the dataset. It is understood that, as used herein, the term "row" is not limited to a particular orientation. To this extent, a row can be horizontal, vertical (e.g., "column"), etc.

Three-dimensional table 52 can include presentation information that makes the displayed data 40 (FIG. 1) more meaningful to user 12 (FIG. 1). For example, two-dimensional table 56A is shown including a header row 62 that comprises a name for each attribute in the displayed dataset, and a label column 63 that comprises a name for each item in the displayed dataset. The values for each entry in header row 62 and/or label column 63 can be stored as part of data 40, automatically obtained based on metadata for data 40, selected by user 12 from data 40, or the like. Additionally, operation system 36 (FIG. 1) can enable user 12 to perform various known spreadsheet operations on data 40 and/or two-dimensional tables 56A-D. To this extent, user 12 can generate an operation request, which is received by operation system 36. In response, operation system 36 can perform the operation on data 40 and/or each two-dimensional table 56A-D.

For example, user 12 can request that operation system 36 (FIG. 1) add row 64 to two-dimensional table 56A-D. In response, operation system 36 can add storage space to data 40 to store additional values for the new row, and add row 64 to each two-dimensional table 56A-D. Subsequently, operation system 36 can perform various other operations on data 40. For example, user 12 can generate an operation request to enter a data value/calculation into an entry in row 64. To this extent, user 12 can enter the text "TOTAL" followed by calculations that sum the values in each corresponding column. In response, operation system 36 can add the text and/or store the calculations in the corresponding entry for each instance of the datasets. Numerous additional operations can be performed as will be recognized by one of ordinary skill in the art.

In any event, interface 50 is also shown including a manipulation request interface 54. Manipulation request interface 54 enables user 12 (FIG. 1) to generate one or more manipulation requests for manipulating three-dimensional table 52. To this extent, manipulation system 38 (FIG. 1) can receive a manipulation request from user 12 and manipulate three-dimensional table 52 based on the manipulation request. In particular, manipulation request interface 54 can allow user 12 to request a desired rotation of three-dimensional table 52. In response, manipulation system 38 can display a corresponding side face 60A-B as front face 58. Additionally, data system 32 (FIG. 1) can redefine the plurality of instances in data 40 (FIG. 1) based on the new front face. In particular, the new front face can correspond to an instance of a dataset with the remaining instances located behind the new front face. Further, for each rotation of three-dimensional table 52, display system 34 (FIG. 1) can add presentation information (e.g., header row 62 and/or label column 63) to make the displayed information more useful to user 12.

Figure 3:
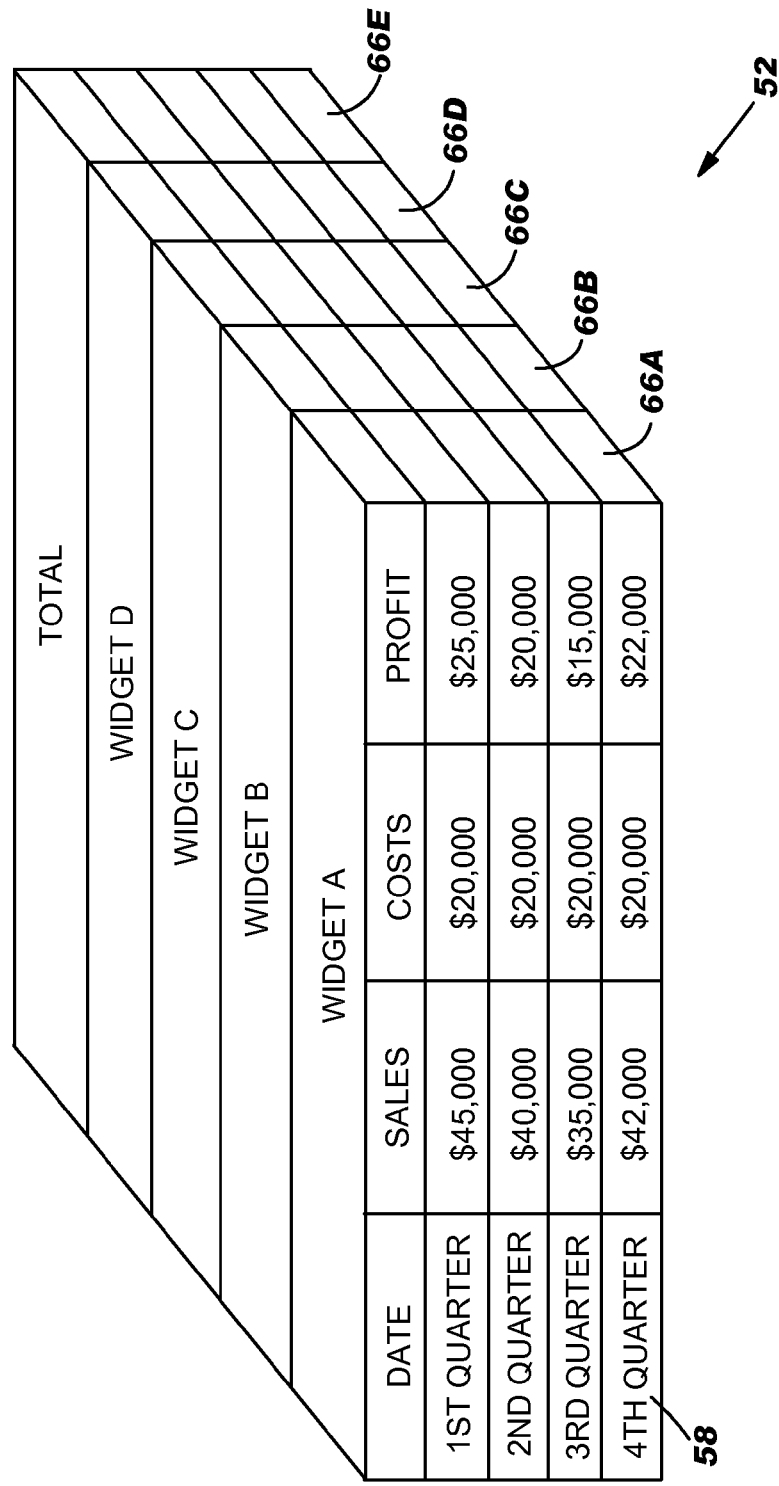
FIG. 3 shows the illustrative three-dimensional table of FIG. 2 after being rotated.
Figure 4:
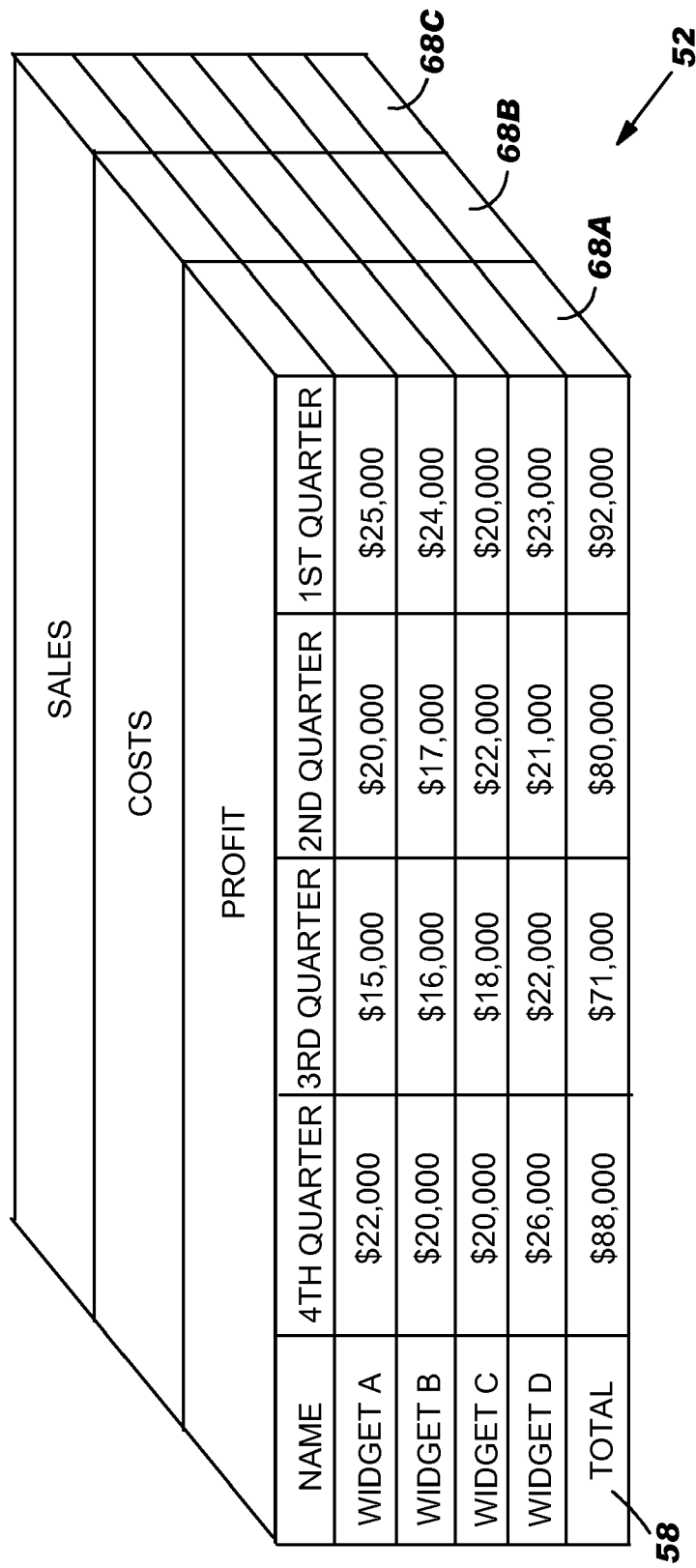
FIG. 4 shows the illustrative three-dimensional table of FIG. 2 after being rotated in a different direction.

For example, FIG. 3 shows three-dimensional table 52 of FIG. 2 after having been rotated so that side face 60A (FIG. 2) is now displayed as front face 58. In particular, three-dimensional table 52 now corresponds to a plurality of two-dimensional tables 66A-D that each correspond to an instance of a widget and one two-dimensional table 66E that corresponds to the newly added total row 64 (FIG. 2). Similarly, FIG. 4 shows three-dimensional table 52 of FIG. 2 after having been rotated so that side face 60B (FIG. 2) is now displayed as front face 58. In this case, three-dimensional table 52 now corresponds to a plurality of two-dimensional tables 68A-C that each correspond to an instance of each attribute for the various attributes of items (e.g., SALES, COSTS, PROFIT). As a result, by enabling the various rotations of three-dimensional table 52, user 12 can selectively alter the portion of data 40 (FIG. 1) that is displayed by three-dimensional table 52 based on the submitted operation request.

Figure 5:
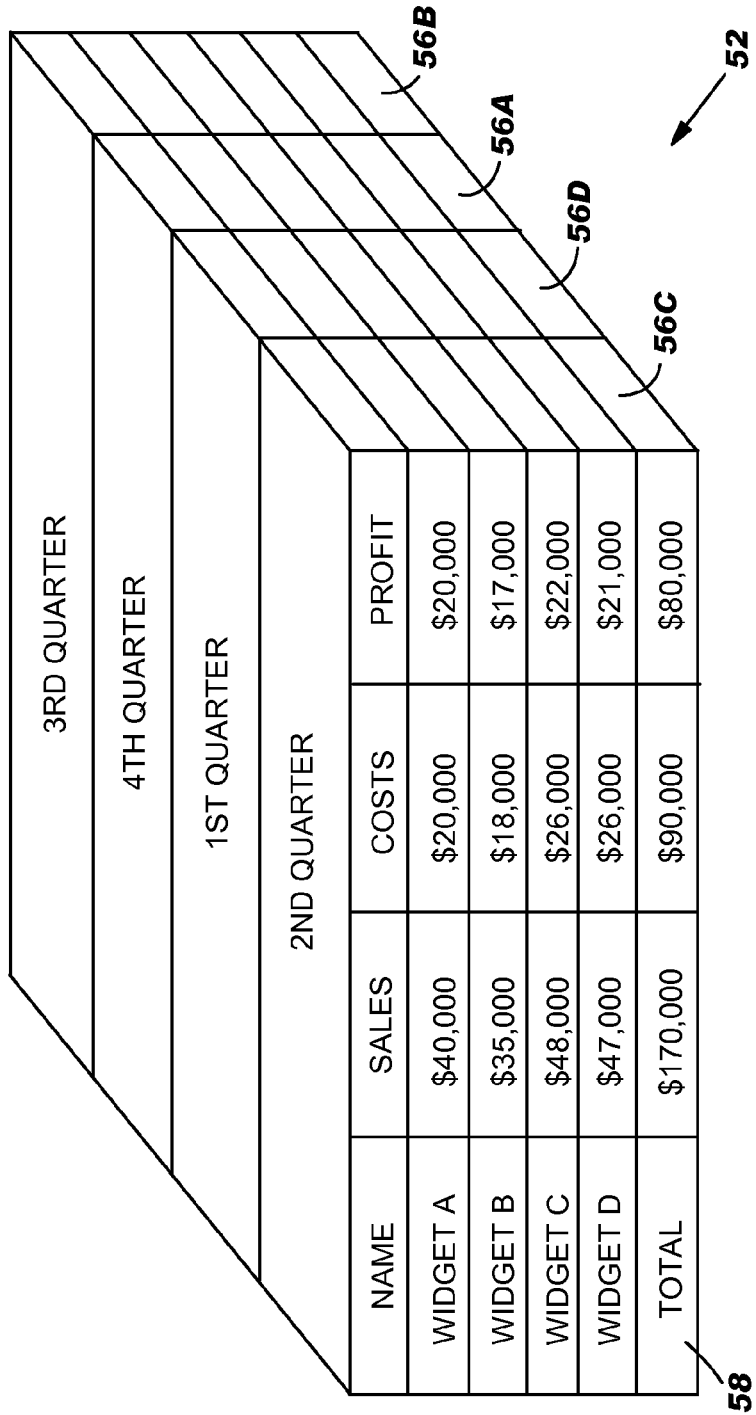
FIG. 5 shows the illustrative three-dimensional table of FIG. 2 after being scrolled.

Returning to FIG. 2, interface 50 can enable user 12 (FIG. 1) to generate manipulation requests using alternative solutions. For example, in response to a user 12 action, such as a mouse-click or the like, manipulation system 38 (FIG. 1) can generate a popup window 70. Popup window 70 can comprise various entries 72A-B that enable user 12 to select a desired manipulation. In response, manipulation system 38 can manipulate three-dimensional table 52 accordingly. For example, when user 12 selects "SCROLL TO FRONT" entry 72A, manipulation system 38 can display the corresponding two-dimensional table 56C as front face 58. To this extent, FIG. 5 shows three-dimensional table 52 of FIG. 2 after two-dimensional tables 56A-D have been "scrolled" so that two-dimensional table 56C is displayed as front face 58. In this case, each previous two-dimensional table 56A-B is moved to the rear of three-dimensional table 52 so that the order of two-dimensional tables 56A-D is maintained. However, it is understood that any solution can be used, for example, two-dimensional table 56C can be removed and inserted at the front, swapped with two-dimensional table 56A, etc.

FIG. 6 shows three-dimensional table 52 of FIG. 2 after manipulation system 38 (FIG. 1) has manipulated it in response to, for example, user 12 (FIG. 1) generating a manipulation request by selecting "SLIDE OUT" entry 72B (FIG. 2). In this case, manipulation system 38 can simultaneously display a selected two-dimensional table 56C with two-dimensional table 56A, which comprises the front face 58 of three-dimensional table 52. Subsequently, user 12 can generate another manipulation request to move two-dimensional table 56C back to its hidden location.

Figure 7:
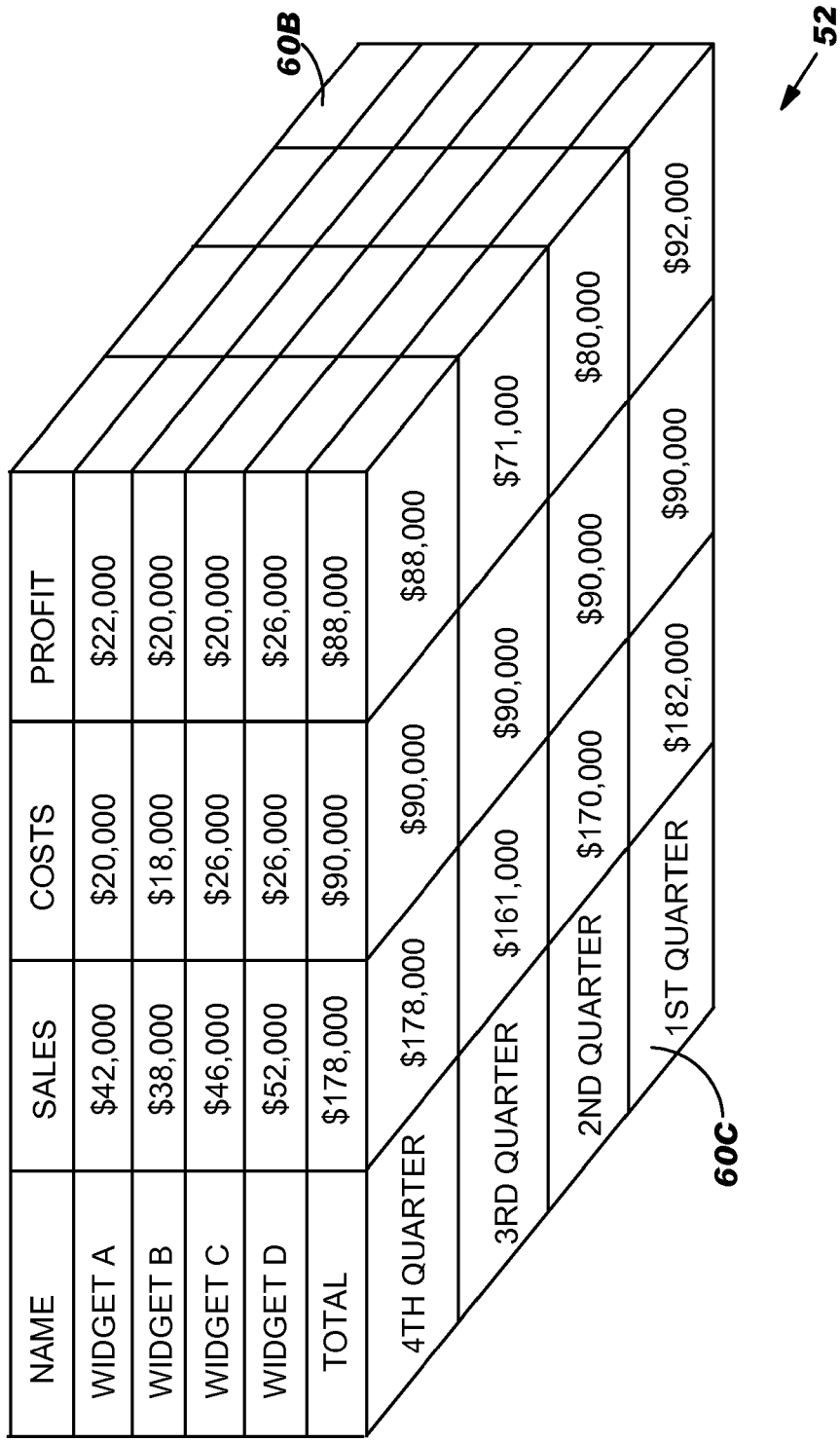
FIG. 7 shows the illustrative three-dimensional table of FIG. 2 after the perspective has been changed.

Various other manipulations are possible. For example, FIG. 7 shows three-dimensional table 52 of FIG. 2 after manipulation system 38 (FIG. 1) has manipulated the perspective from which three-dimensional table 52 is viewed. To this extent, manipulation system 38 can further manipulate three-dimensional table 52 to display data on one or more of the side faces 60B-C that can be viewed by user 12. For example, side face 60C is shown displaying the total data for each of the quarters included in three-dimensional table 52.

It is understood that the various manipulations discussed herein are only illustrative. For example, any number of two-dimensional tables 56A-D could be displayed simultaneously. Additionally, three-dimensional table 52 could be modified by filtering one or more instances, removing one or more data attributes, etc. Further, it is understood that the various solutions for enabling user 12 (FIG. 1) to generate a manipulation request are only illustrative. For example, a button bar, fixed and/or floating menus, hot key(s), one or more clicks on a pointing device, etc., can be used as are known in the art. It is understood that similar solutions can be implemented for generating an operation request. Still further, it is understood that while operation requests and manipulation requests are discussed as being generated by user 12, these requests could be received from another computing device and/or computer software, which generates the requests in response to some user action, update of data, or the like.

In another illustrative application, three-dimensional table 52 (FIG. 2) can be used to display build status data for a set of software components. In particular, for each build, a dataset can be generated that includes a component name, a component version, and a build state (e.g., success or failure) for the component. Each time a build is completed, a new instance of the dataset can be generated.

Figure 8:
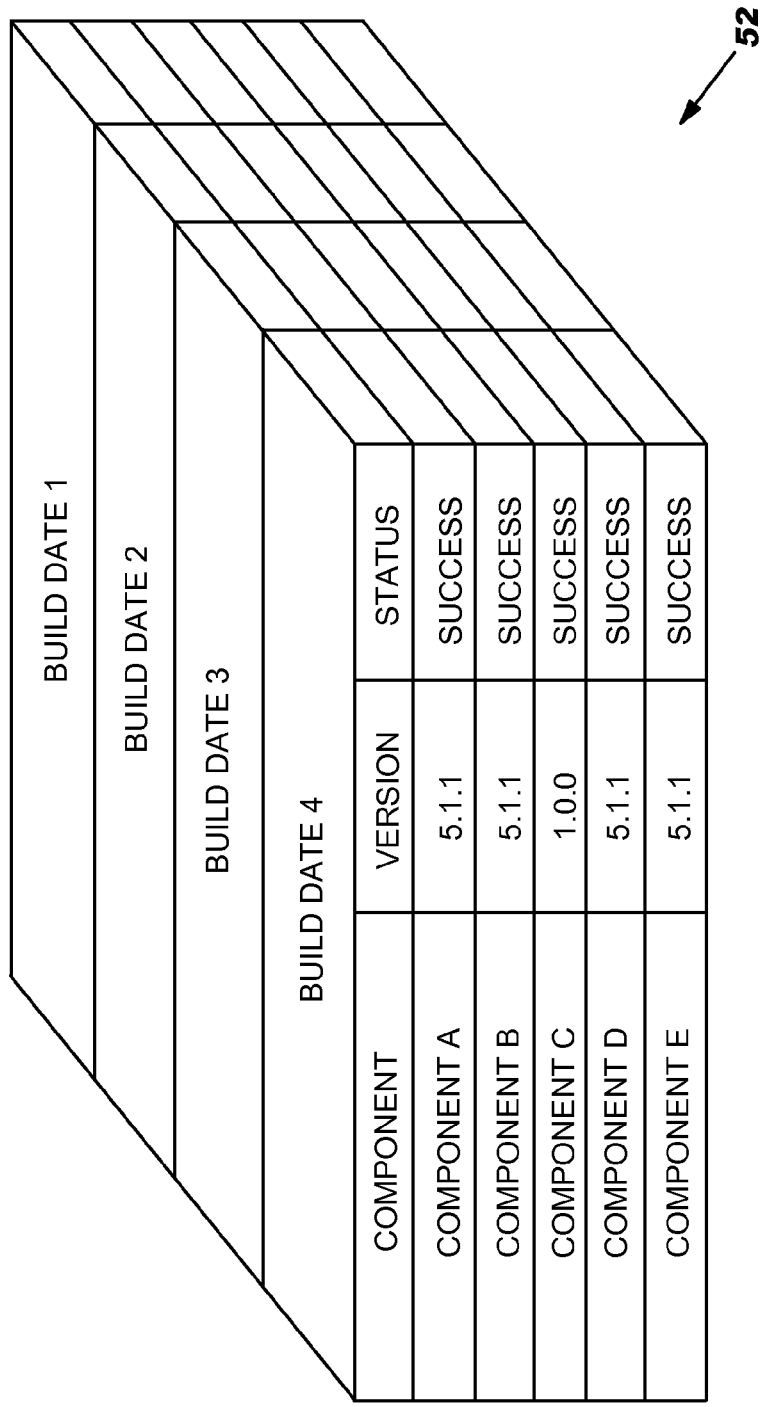
Figure 10:
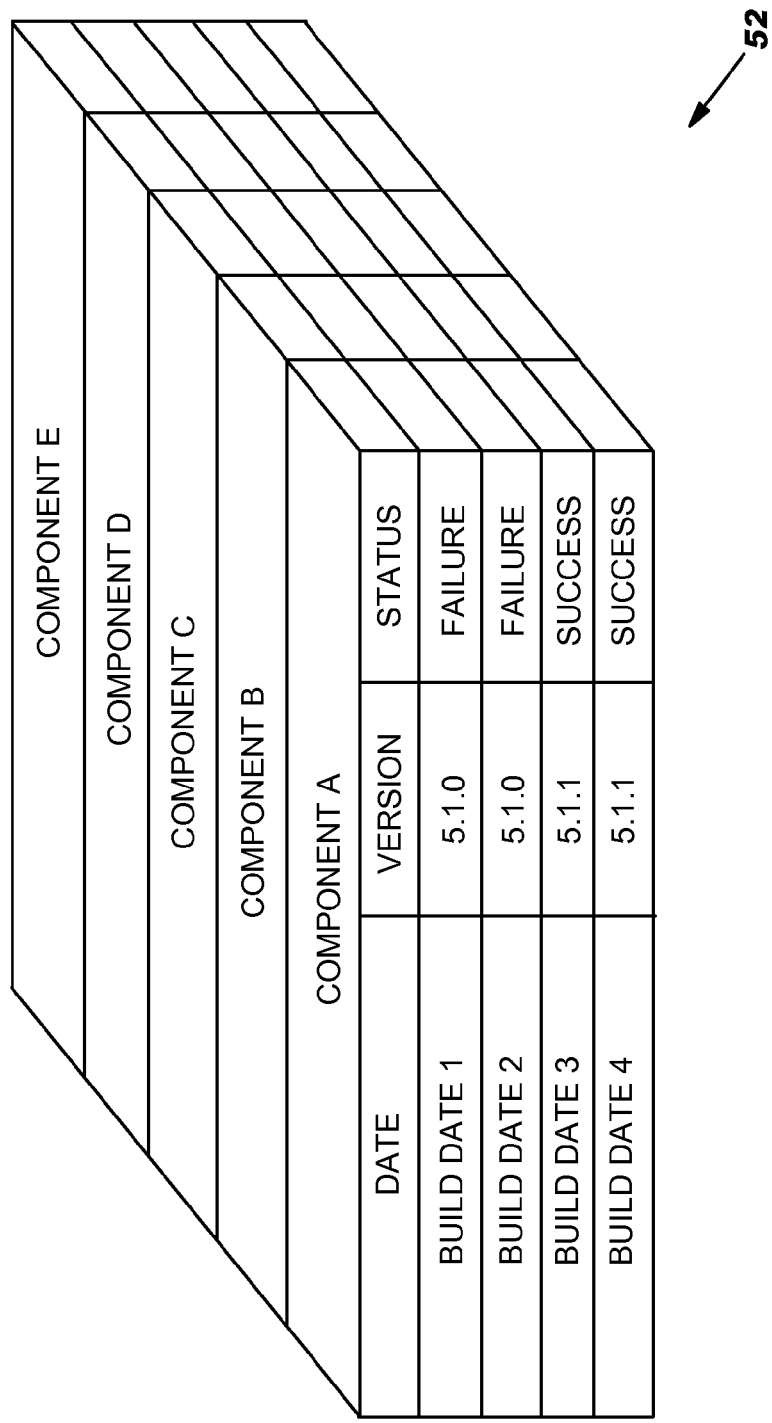

To this extent, FIGS. 8-10 show an illustrative three-dimensional table 52 for displaying a plurality of instances of a build dataset according to an embodiment of the invention. In FIG. 8, the dataset for a most recent build (e.g., corresponding to BUILD DATE 4) can be displayed as a front face, with each previous build comprising a row on at least one side face. FIG. 9 shows three-dimensional table 52 after being manipulated in order to simultaneously display the datasets for two builds (e.g., BUILD DATE 4 and BUILD DATE 2). FIG. 10 shows three-dimensional table 52 after being rotated to display a different dataset as the front face. In this case, the dataset for a particular component (e.g., COMPONTENT A) is displayed as the front face, with the other components comprising rows on at least one side face.

In any event, data system 32 (FIG. 1) can manage the build datasets using any solution. For example, data system 32 can store the data for each dataset in a relational database. In one embodiment, each dataset could be stored as a record in a single database table, in which each data item has a corresponding field in the record. Alternatively, each dataset can be stored in two tables, e.g., a first table that stores one or more records for each component (e.g., component identifier, component name, component version) and a second table that includes one or more records for each build (e.g., build identifier, component identifier, build date, build status). Each record can be uniquely identified by its corresponding identifier, and each component record can be related to one or more build records via the component identifier in each build record.

In order to generate three-dimensional table 52, data system 32 (FIG. 1) can generate one or more standard query language (SQL) calls to obtain the data to be displayed in three-dimensional table 52. For example, in order to generate the three-dimensional table 52 of FIG. 8, data system 32 can use a select statement that selects all records having the same build identifier, and obtains the component information for each record using the component identifier in the build record. In this manner, the data for the front face of three-dimensional table 52 can be obtained. Data system 32 can repeat the select statement(s) for each unique build identifier to obtain data for the subsequent builds.

When generating three-dimensional table 52, display system 34 (FIG. 1) can use default settings for the data displayed for the front face (e.g., data on most recent build) and/or obtain a selection from a user 12 (FIG. 1) using any solution. For example, for the four fields of data in the illustrative application (e.g., build date, build status, component name, component version), user 12 can select three fields of data for displaying on the front face (e.g., component name, component version, and build status in FIG. 8), and the fourth field (e.g., build date) can be automatically used to generate each row in three-dimensional table 52. Further, user 12 can select the particular row to be displayed in the front face (e.g., build date 4 in FIG. 8). Using this information, display system 34 can generate three-dimensional table 52.

In order to improve performance, data system 32 (FIG. 1) can temporarily store a copy of the data in a three-dimensional array or the like. To this extent, each element in the three-dimensional array can be accessed using a corresponding tuple (x, y, z). To this extent, when data system 32 obtains the data for a particular build date, the data can be stored in a two dimensional array (x,y). The two-dimensional arrays can be combined to form a three-dimensional array (x,y,z), in which the z dimension corresponds to each particular build.

To generate three-dimensional table 52 of FIG. 8, data system 32 can obtain the data for the front face of FIG. 8 by selecting the entries corresponding to (x, y, 0), where the zero z-dimension corresponds to data for BUILD DATE 4. To obtain data for a subsequent manipulation request, e.g., the manipulation shown in FIG. 9, data system 32 can obtain the data by selecting the entries corresponding to (x, y, 2), where the two z-dimension corresponds to data for BUILD DATE 2. Similarly, to obtain data for a manipulation request resulting in the three-dimensional table 52 of FIG. 10, data system 32 can obtain the data from the temporary copy by traversing the dimensions in a different order (z, y, 0), where the zero x-dimension corresponds to data for COMPONENT A. It is understood that these manipulations and corresponding data selections are only illustrative and various additional/alternative solutions for managing data 40 (FIG. 1) will be apparent to one skilled in the art.

Figure 11:
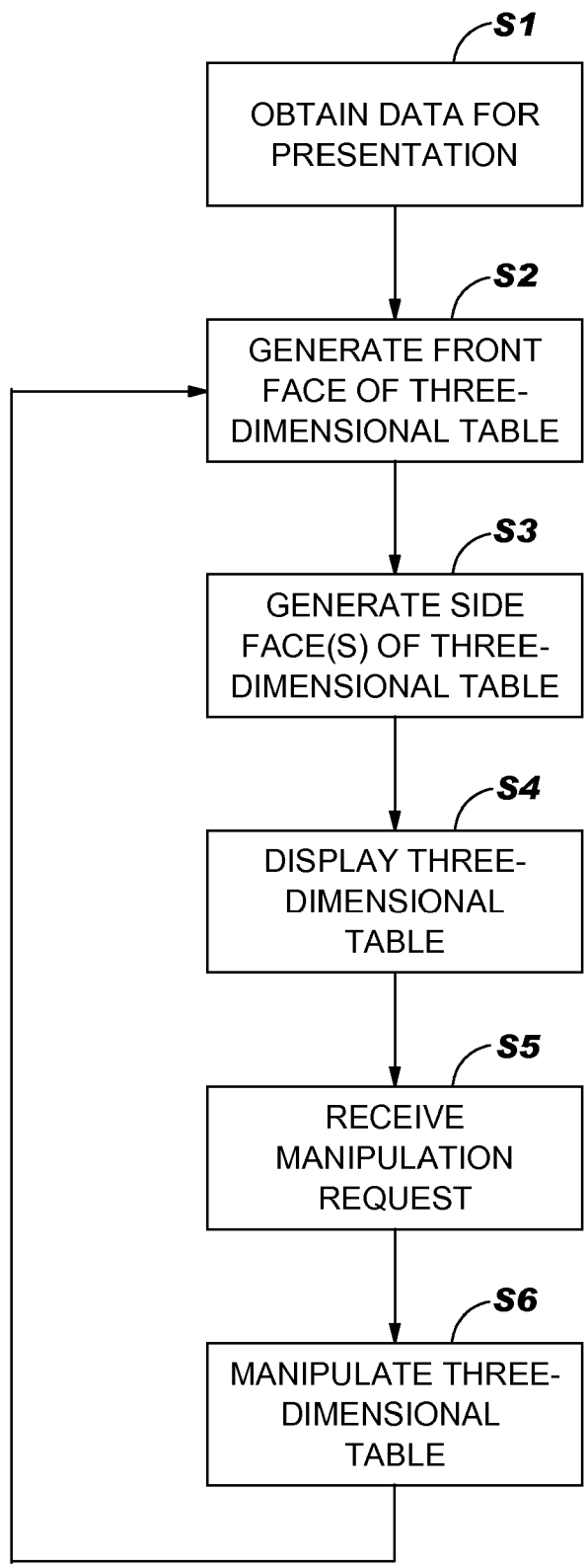
FIG. 11 shows illustrative method steps according to one embodiment of the invention.

As discussed herein, the invention includes methods for managing the three-dimensional table 52. For example, FIG. 11 shows illustrative method steps according to one embodiment of the invention. In step S1, data 40 (FIG. 1) to be presented to user 12 (FIG. 1) is obtained. In step S2, front face 58 (FIG. 2) of three-dimensional table 52 (FIG. 2) is generated based on, for example, data values for one of a plurality of instances of datasets in data 40. In step S3, at least one side face 60A-B (FIG. 2) of three-dimensional table 52 is generated based on, for example, the plurality of instances of datasets. In step S4, three-dimensional table 52 is displayed to user 12. In step S5, a manipulation request is received, and in step S6, three-dimensional table 52 is manipulated based on the manipulation request. Subsequently, flow returns to step S2, in which the various faces of the manipulated three-dimensional table 52 are re-generated for display to user 12. It is understood that the various steps are only illustrative and various alterations are possible. For example, for some manipulations (e.g., a rotation), flow could return to step S4 since the corresponding faces may have already been generated.

Regardless, it should be appreciated that the teachings of the present invention could be offered as a business method on a subscription or fee basis. For example, presentation system 30 (FIG. 1) and/or computer 14 (FIG. 1) could be created, maintained, supported and/or deployed by a service provider that offers the functions described herein for customers. That is, a service provider could offer to manage a three-dimensional table for presenting data to a user as described above. It is understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing a three-dimensional table for presenting data, the method executed using a processor of a computer and comprising:
   generating the three-dimensional table for the data, wherein the three-dimensional table comprises a plurality of two-dimensional tables that define a front face and at least one side face;
   receiving a manipulation request to simultaneously display a particular one of the two-dimensional tables displayed as the front face of a three-dimensional display of the three-dimensional table and a selected one of the two-dimensional tables which is distinct from the particular one; and
   manipulating the three-dimensional display of the three-dimensional table to visually slide the selected one of the two-dimensional tables out from the three-dimensional display of the three-dimensional table, based on the manipulation request, thereby simultaneously displaying the particular one of the two-dimensional tables displayed as the front face and the selected one.

2. The method according to claim 1, further comprising:
   receiving a subsequent manipulation request to simultaneously display a different one of the two-dimensional tables, while simultaneously displaying the particular one and the selected one, wherein the different one is distinct from the particular one and the selected one; and
   manipulating, responsive to the subsequently-received manipulation request, the three-dimensional display of the three-dimensional table by visually sliding the different one out from the three-dimensional display to a different position than a position occupied by the slid-out selected one.

3. The method according to claim 1, wherein the manipulation request is received from a user.

4. The method according to claim 1, wherein the manipulation request is received from a software application responsive to an update of the data.

5. A system for managing a three-dimensional table for presenting data, the system comprising:
   a computer comprising a processor; and
   instructions which are executable, using the processor, to provide:
   a display system for generating the three-dimensional table for the data, wherein the three-dimensional table comprises a plurality of two-dimensional tables that define a front face and at least one side face; and
   a manipulation system for receiving a manipulation request to simultaneously display a particular one of the two-dimensional tables displayed as the front face of a three-dimensional display of the three-dimensional table and a selected one of the two-dimensional tables which is distinct from the particular one, and manipulating the three-dimensional display of the three-dimensional table to visually slide the selected one of the two-dimensional tables out from the three-dimensional display of the three-dimensional table, based on the manipulation request, to thereby simultaneously display the particular one of the two-dimensional tables displayed as the front face and the selected one.

6. The system according to claim 5, wherein:
   the manipulation system receives a subsequent manipulation request to simultaneously display a different one of the two-dimensional tables, while simultaneously displaying the particular one and the selected one, wherein the different one is distinct from the particular one and the selected one; and
   the manipulation system manipulates, responsive to the subsequently-received manipulation request, the three-dimensional display of the three-dimensional table by visually sliding the different one out from the three-dimensional display to a different position than a position occupied by the slid-out selected one.

7. The system according to claim 5, wherein the manipulation request is received from a user.

8. The system according to claim 5, wherein the manipulation request is received from a software application responsive to an update of the data.

9. A program product stored on a computer-readable storage medium, which when executed, manages a three-dimensional table for presenting data, the program product comprising:
   program code for generating the three-dimensional table for the data, wherein the three-dimensional table comprises a plurality of two-dimensional tables that define a front face and at least one side face;
   program code for receiving a manipulation request to simultaneously display a particular one of the two-dimensional tables displayed as the front face of a three-dimensional display of the three-dimensional table and a selected one of the two-dimensional tables which is distinct from the particular one; and
   program code for manipulating the three-dimensional display of the three-dimensional table to visually slide the selected one of the two-dimensional tables out from the three-dimensional display of the three-dimensional table, based on the manipulation request, thereby simultaneously displaying the particular one of the two-dimensional tables displayed as the front face and the selected one.

10. The program product according to claim 9, wherein:
    the program code for receiving a manipulation request receives a subsequent manipulation request to simultaneously display a different one of the two-dimensional tables, while simultaneously displaying the particular one and the selected one, wherein the different one is distinct from the particular one and the selected one; and the program code for manipulating the three-dimensional display manipulates, responsive to the subsequently-received manipulation request, the three-dimensional display of the three-dimensional table by visually sliding the different one out from the three-dimensional display to a different position than a position occupied by the slid-out selected one.

11. The program product according to claim 9, wherein the manipulation request is received from a user.

12. The program product according to claim 9, wherein the manipulation request is received from a software application responsive to an update of the data.

13. An interface for presenting data to a user, the interface comprising:
   means for generating a three-dimensional table for the data, wherein the three-dimensional table comprises a plurality of two-dimensional tables that define a front face and at least one side face;
   means for displaying a three-dimensional representation of the three-dimensional table to the user;
   means for receiving a manipulation request from the user to simultaneously display a particular one of the two-dimensional tables displayed as the front face of the displayed three-dimensional representation of the three-dimensional table and a selected one of the two-dimensional tables which is distinct from the particular one; and
   means for manipulating the displayed three-dimensional representation of the three-dimensional table to visually slide the selected one of the two-dimensional tables out from the three-dimensional display of the three-dimensional table, based on the manipulation request, thereby simultaneously displaying the particular one of the two-dimensional tables displayed as the front face and the selected one.

14. The interface according to claim 13, further comprising:
   means for receiving a subsequent manipulation request to simultaneously display a different one of the two-dimensional tables, while simultaneously displaying the particular one and the selected one, wherein the different one is distinct from the particular one and the selected one; and
   means for manipulating, responsive to the subsequently-received manipulation request, the three-dimensional display of the three-dimensional table by visually sliding the different one out from the three-dimensional display to a different position than a position occupied by the slid-out selected one.

15. The interface according to claim 13, wherein the manipulation request is received from a user.

16. The interface according to claim 13, wherein the manipulation request is received from a software application responsive to an update of the data.

17. A method of deploying an application for managing a three-dimensional table for presenting data, the method comprising:
   providing a computer infrastructure being operable on a processor of a computer to:
      obtain the data, wherein the data comprises a plurality of instances of a dataset;
      generate a plurality of two-dimensional tables, each comprising data for one of the plurality of instances;
      generate a three-dimensional table from the plurality of generated two-dimensional tables;
      display a three-dimensional representation of the three-dimensional table;
      receive a manipulation request to simultaneously display a particular one of the two-dimensional tables displayed as a front face of the displayed three-dimensional representation of the three-dimensional table and a selected one of the two-dimensional tables which is distinct from the particular one; and
      manipulate the displayed three-dimensional representation of the three-dimensional table to visually slide the selected one of the two-dimensional tables out from the three-dimensional display of the three-dimensional table, based on the manipulation request, thereby simultaneously displaying the particular one of the two-dimensional tables displayed as the front face and the selected one.

18. The method according to claim 17, wherein the computer infrastructure is further operable to:
   receive a subsequent manipulation request to simultaneously display a different one of the two-dimensional tables, while simultaneously displaying the particular one and the selected one, wherein the different one is distinct from the particular one and the selected one; and
   manipulate, responsive to the subsequently-received manipulation request, the three-dimensional display of the three-dimensional table by visually sliding the different one out from the three-dimensional display to a different position than a position occupied by the slid-out selected one.

19. The method according to claim 17, wherein the manipulation request is received from one of a user or a software application responding to an update of the data.

* * * * *